(12) United States Patent
Ando et al.

(10) Patent No.: US 8,870,371 B2
(45) Date of Patent: Oct. 28, 2014

(54) COLORED CONTACT LENS

(75) Inventors: Ichiro Ando, Kasugai (JP); Yuji Goto, Komaki (JP); Ryo Matsushita, Nagoya (JP); Kazuharu Niwa, Nagoya (JP)

(73) Assignee: Menicon Co., Ltd., Nagoya-shi (JP)

( * ) Notice: Subject to any disclaimer, the term of this patent is extended or adjusted under 35 U.S.C. 154(b) by 0 days.

(21) Appl. No.: 13/704,876

(22) PCT Filed: Jun. 17, 2011

(86) PCT No.: PCT/JP2011/003470
§ 371 (c)(1),
(2), (4) Date: Dec. 21, 2012

(87) PCT Pub. No.: WO2011/161920
PCT Pub. Date: Dec. 29, 2011

(65) Prior Publication Data
US 2013/0093994 A1   Apr. 18, 2013

(30) Foreign Application Priority Data
Jun. 21, 2010 (JP) ................................ 2010-140265

(51) Int. Cl.
*G02C 7/04* (2006.01)
*G02C 7/02* (2006.01)
*B41M 5/00* (2006.01)

(52) U.S. Cl.
CPC ............... *G02C 7/046* (2013.01); *G02C 7/021* (2013.01); *G02C 7/04* (2013.01); *B41M 5/0047* (2013.01); *B41M 5/0064* (2013.01); *B41M 5/0088* (2013.01); *G02C 2202/16* (2013.01)
USPC .................................................. 351/159.31

(58) Field of Classification Search
CPC .......... G02C 7/021; G02C 7/04; G02C 7/046
USPC ....................................... 351/159.24–159.32
See application file for complete search history.

(56) References Cited

U.S. PATENT DOCUMENTS

| | | | |
|---|---|---|---|
| 4,582,402 A | 4/1986 | Knapp | |
| 5,034,166 A | 7/1991 | Rawlings et al. | |
| 5,116,112 A | 5/1992 | Rawlings | |
| 5,120,121 A | 6/1992 | Rawlings et al. | |
| 5,160,463 A | 11/1992 | Evans et al. | |
| 5,302,978 A | 4/1994 | Evans et al. | |
| 2002/0039172 A1 | 4/2002 | Ocampo | |
| 2003/0025873 A1 | 2/2003 | Ocampo | |
| 2003/0117576 A1 | 6/2003 | Thakrar et al. | |
| 2005/0122471 A1 | 6/2005 | Ocampo | |
| 2005/0254002 A1 | 11/2005 | Dukes et al. | |
| 2006/0050232 A1 | 3/2006 | Dukes et al. | |
| 2006/0181676 A1* | 8/2006 | Tucker et al. | 351/162 |
| 2007/0182922 A1 | 8/2007 | Ocampo | |
| 2009/0046243 A1 | 2/2009 | Ocampo | |
| 2010/0073630 A1 | 3/2010 | Dukes et al. | |
| 2011/0187992 A1* | 8/2011 | Bowers et al. | 351/162 |

FOREIGN PATENT DOCUMENTS

| | | |
|---|---|---|
| CN | A-101010618 | 8/2007 |
| EP | 0 384 632 A1 | 8/1990 |
| JP | A-60-235115 | 11/1985 |
| JP | A-3-15020 | 1/1991 |
| JP | A-3-54519 | 3/1991 |
| JP | A-4-264517 | 9/1992 |
| JP | A-2003-532911 | 11/2003 |
| JP | A-2004-503815 | 2/2004 |
| JP | A-2007-537492 | 12/2007 |
| JP | A-2008-511025 | 4/2008 |
| JP | A-2008-511026 | 4/2008 |
| JP | 82-4495780 | 4/2010 |
| WO | WO 2006/023632 A1 | 3/2006 |
| WO | WO 2009/044853 A1 | 4/2009 |

OTHER PUBLICATIONS

International Search Report issued in International Application No. PCT/JP2011/003470 dated Jul. 19, 2011 (w/translation).
Sep. 22, 2013 Office Action issued in Chinese Patent Application No. 201180030681.0 (with English Translation).
Japanese Office Action issued in Japanese Patent Application No. 2013-007822 dated Feb. 28, 2014 (w/ partial translation).
Japanese Office Action issued in Japanese Patent Application No. 2013-007825 dated Feb. 28, 2014 (w/ partial translation).
Chinese Office Action issued in Chinese Patent Application No. 201180030681.0 dated Apr. 3, 2014 (w/ translation).
European Search Report issued in Application No. 11797809.8 on Jun. 10, 2014.

* cited by examiner

*Primary Examiner* — Darryl J Collins
(74) *Attorney, Agent, or Firm* — Oliff PLC (57) ABSTRACT

Provided is a colored contact lens in which a colored band is disposed at a boundary part between a dark part and a white part of an eye, and a density is gradually changed from the dark part to the white part of the eye such that the density of this colored band decreases from an inner circumference side to an outer circumference side. As a result, a novel colored contact lens is provided with which it is possible to bring out beauty of the white part of the eye, which has been ignored by conventional technology, while an impression is maintained that is as natural and elegant as possible by avoiding an artificial impression such as that found in conventional technology.

9 Claims, 6 Drawing Sheets

COLORED CONTACT LENS

TECHNICAL FIELD

The present invention relates to a colored contact lens, and particularly relates to a colored contact lens tint has a novel structure, which is able to give a natural cosmetic (beauty) effect on the eye of the wearer that was unavailable m the past, by providing a colored area on a specific part in a novel way

BACKGROUND ART

From the past, as one type of contact lens worn overlapping the cornea of the eye, several colored contact lenses have been proposed. As shown in Japanese Unexamined Patent Publication No. JP-A-60-235115 (Patent Document 1), almost all of these prior art colored contact lenses are colored in the area covering the dark part of the eye for which the color of the iris can be seen through the cornea, and make the dark part of the eye part look like a different color from the actual color. Because of that, this merely provides a colored contact lens that only colors more to the inner circumference side than the boundary line (limbus) of the dark part of the eye and the white part of the eye.

Meanwhile, proposed in PCT Japanese Translation Patent Publication No. JP-A-2008-511025 (Patent Document 2) is a colored contact lens for which a colored area is formed with a larger outer diameter than the limbus, which colors also as far as the white part of the eye. This colored contact lens makes the outer diameter of the dark part of the eye larger and strongly emphasizes and clarifies the outer edge, thus making it possible to make the overall facial expression appear cute and bright, and these are already available on the market.

However, the same as with the colored contact lens noted in Patent Document 1, the colored contact lens noted in Patent Document 2 is the same in that it focuses only on making the appearance of the dark part of the eye part different. Then, with the goal of making the dark part of the eye part of the lens wearer appear larger and have the outer edge stand out to others, the outer circumference edge part of the colored area is formed using a clear, circular line, and the outer edge of the colored area is a clearly visible line.

However, as a result of earliest study based on evaluation of several samples by the inventors of the present invention, with the colored contact lens noted in Patent Document 2, though it Was possible to give third parties a different evaluation image of the expression of the wearer, we found that this was still insufficient in terms of making the "eye" itself look beautiful. Specifically, the colored contact lens noted in Patent Document 2 simply makes it possible to say the dark part of the eye looks bigger," and the color of the dark part of the eye is different," and with that alone, it is difficult to say that this is sufficient in terms of showing the beauty of the overall eye including the dark part of the eye and the white part of the eye, To say this another way, the colored contact lens noted in Patent Document 2 can also be thought of as intending to make the clear colored line at the outer edge of the dark part of the eye stand out sharply. However, when the boundary line of the dark part of the eve and the white part of the eye are made to stand out as this kind of sharp line, this gives too much of an artificial impression to others, making it is easy to perceive them as being robot eyes (artificial eyes), and because of that, especially for a typical person who is not a model or the like, it was determined that it is difficult to say that the goal of "making the overall eye look beautiful" can be achieved.

BACKGROUND ART DOCUMENTS

Patent Documents

Patent Document 1: JP-A-60-235115
Patent Document 2: JP-A-2008-511025

SUMMARY OF THE INVENTION

Problem the Invention Attempts to Solve

The present invention was created with the circumstances described above as the background., and the problem it is to solve is to provide a colored contact lens with a novel structure that is able to make the overall eye of the wearer appear beautiful naturally.

Means for Solving the Problem

The characteristic feature of the present invention is a colored contact lens adapted to worn on an eye, comprising: a ring shaped colored band arranged for covering a boundary line of a dark part and a white part of the eye, while broadening on an inner circumference side and an outer circumference side of the boundary line, wherein a density of the colored band decreases from the inner circumference side toward the outer circumference side, and an inner diameter dimension of the colored band is o 8 rum or greater, and an outer diameter dimension of the colored band is φ 14 mm or less.

By wearing a colored contact lens of a structure according to this mode, based on the density change given to the colored band for the white part of the eye positioned at the outer circumference side of the dark part of the eye, a transitional area is provided that becomes gradually thinner going from the dark part of the eye to the white part of the eye, becoming similar as if transitions from the dark part of the eye to the white part of the eye, and also becomes gradually denser from the white part of the eye toward the dark part of the eye, becoming similar going from the white part of the eye toward the dark part of the eye. Then, by positioning the dark part of the eye and the white part of the eye sandwiching this transitional area, it is possible to avoid generating a clear line on the boundary line of the dark part of the eye and the white part of the eye, and to give to the eye of the wearer an external appearance that is more natural and warm.

In particular, with the human eye, in early childhood more than in adulthood, there is often recognition of a transitional area that includes a clear density change to the degree that it is visible from outside at the boundary part of the dark part of the eye and the white part of the eye, and this being seen as bluish white in terms of external appearance gives a pure impression that gives a healthier, more youthful impression than adults. However, with aging, an unhealthy impression is given due to yellowing of the white part of the eyes, becoming more bloodshot and the like, and the youthfulness of the external appearance is lost. Because of that, by wearing the colored contact lens of the present invention, the impression of the eyes as seen by others is more youthful and fresh, giving a pure, fresh impression, so it is possible to have the entire eye shown more beautifully.

In fact, as a coloring effect of this transitional area, it is possible to also make the dark part of the eye look bigger to the outer circumference side, and because of that, by wearing the colored contact lens of the present invention, we can also expect the effect of giving a more friendly feeling with the impression of the eyes seen by others.

As is well known, the color of the iris differs, being black, brown, green, blue or the like according to the volume of melanin pigment, but with the present invention, regardless of that color, the part for which the color of the iris can be seen through the cornea is referred to as "the dark part of the eye," and the part outside of that which is the sclera is referred to as the white part of the eye.

Also, the "density" with the present invention is synonymous with "the ratio of reflected light per unit surface area (to projected light)" with the lens on its own. For example, with the dot form coloring mode, this is expressed as "the ratio of total dot surface area (colored surface area) per unit surface area," so even if the dot size is the same, if the number of dots (concentration) is made different, then the density will be different, and even if the dot count (concentration) is the same, if the size of one dot is made different, then the density will be different. Also, even if the colored surface area is the same, if the transparency or depth is different, then the density will be different.

When the typical human eye is the subject, when the colored band inner diameter dimension is smaller than o 8 min there is the risk of the colored band going as far as the pupil and adversely affecting vision. Meanwhile, when the colored band outer diameter dimension is larger than φ 14 mm, there is the risk that the area of the white part of the eye which is not covered by the colored band and is positioned at the outer circumference side of the colored band becomes too small, resulting in the color enhancing effect on the color band or dark part of the eye by the white part of the eye or conversely the color enhancing effect on the white part of the eye by the dark part of the eye or colored band being insufficient and looking unnatural, making it difficult to sufficiently achieve the target effect of improving the beauty of the eye.

Also, with the colored contact lens of the present invention, the colored band is formed including at least one of blue and green as a hue.

By using a blue or peen hue system correlating to a complementary color of red or yellow for the colored band positioned at the part that transitions from the dark part of the eye to the white part of the eye in this way, the unhealthy impression given to others due to bloodshot eyes or yellowing of the white part of the eyes that comes with aging is reduced, and as a result, the impression of the eves as seen by others is young and fresh, and it is possible to more effectively give a pure, fresh image. This was confirmed both theoretically and empirically by the inventors as shown with the embodiments of the present invention described later.

Also, with the colored contact lens of the present invention, it is preferable to use a mode whereby the colored band is formed by adhesion of colored dots to the lens, and the density of the colored band is made to be different in a radial direction by changing at least one of a size of the colored dot, a number of the colored dot per unit surface area, and a density of a coloring agent of the colored dot itself By implementing coloring on the lens using colored dots in this way, by adjusting the colored dots size or density or the like, it is possible to set the density for the colored band, and to easily and with good precision adjust changes of the density in the radial direction.

In particular, when forming the colored band using colored dots, it is preferable to form the colored dots using inkjet printing, and by doing that, with high level density setting precision, it is possible to more easily and efficiently form the target colored band.

Also, with the colored contact lens of the present invention, it is preferable that the colored band be formed by adhering light permeable dye ink to the lens.

Forming the colored band using dye ink that transmits visible light beams is especially preferable, and by doing that, the colored band can be shown more naturally and beautifully. Also, by using dye ink with a degree of transparency, even in a case when the colored band reaches as far as the pupil, it is possible to reduce the adverse effect on vision.

Furthermore, with the colored contact lens of the present invention, it is also acceptable to provide a fixed density area for which the density is fixed for a desisted width in the radial direction at the inner circumference part of the colored band.

By providing this kind of fixed density area, for example with density changes eliminated at the area overlapping the dark part of the eye, unnecessary color and density changes at the dark part of the eye part are suppressed, and it is also possible to make the dark part of the eye look one level clearer and bigger using a color of roughly the same density as the dark part of the eye up to an area slightly larger than the actual dark part of the eye, Also, with the colored contact lens of the present invention, at further to the outer circumference side of the colored band, it is also possible to provide as non-colored area.

By providing this kind of non-colored area, regardless of the external diameter dimension of the contact lens, it is possible to freely set the size of the colored band outer diameter dimension, Furthermore, with the colored contact lens of the present invention, it is also acceptable to additionally depict an iris pattern on the area positioned on the inner circumference side of the boundary line. By providing an iris pattern, it is possible to more effectively change and adjust the color and density of the dark part of the eye without a significant loss of the naturalness. This iris pattern can be formed by drawing using suitable colored dots, planes, lines, or a combination of these, for example.

Effect of the Invention

The colored contact lens constituted according to the present invention provides a colored area for which the density transitions in the boundary part of the dark part of the eye and white part of the eye based on the reverse idea of the concept of "making a clear colored line stand out sharply at the outer edge of the dark part of the eye with the prior art, and by doing this, it succeeded in giving a special cosmetic effect to the "white part of the eye part" near the dark part of the eye which was not paid attention to in the past.

As a result, it was possible to offer a novel contact lens with which an artificial impression like that of the prior art is avoided, and the beauty is brought out by using the white eye part which was not paid attention to in the past while staying as natural and friendly as possible.

This patent application contains colored images to demonstrate the effectiveness and novelty of the colored contact lenses.

EMBODIMENTS FOR CARRYING OUT THE INVENTION

Following, we will describe embodiments of the present invention while referring to the drawings.

Figure 1:
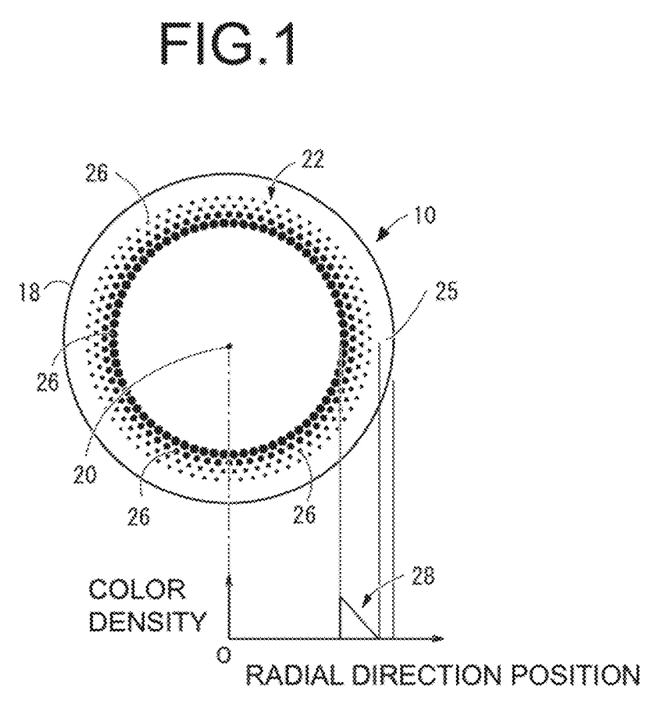
FIG. 1 is a front explanatory view showing a colored contact lens according to a first embodiment of the present invention.

FIG. 1 shows a front view of a colored contact lens 10 as a first embodiment of the present invention. This colored contact lens 10 has a shape according to a conventionally known contact lens, and so as to be worn overlapping the surface of the cornea of the eye, is formed having a partial spherical shell shape having a front surface in a spherical convex surface shape and a back surface in a spherical concave surface shape.

The material of the colored contact lens 10 is not restricted, and it is possible to use not only a hard lens such as an RGP lens (oxygen permeable lens) or FNMA (polymethyl methacrylate) or the like, but also soil contact lenses of a hydrophilic item such as PHEMA (polyhydroxyethyl methacrrlate) or the like, a non-hydrophilic item such as an acrylic elastomer, or high oxygen permeable item such as silicone hydrogel or the like. In particular, compared to a hard contact lens, a soft contact let is typically has a wide diameter and sufficiently covers the white part of the eye, and since the Movement volume : on the cornea during wearing is also small, it is preferably used with the present Also, this colored contact lens 10 may also be a contact lens given specific optical Characteristics in the center : area overlapping the cornea for vision correction given a function of collecting vision abnormalities such as myopia, hyperopia, presbyopia and the like, but it is also acceptable to be a contact lens not for vision correction which is not given those kinds of specific optical characteristics. When providing as a contact lens not for vision correction, this can be used for cosmetic lenses (contact lenses for beauty or dress up) applications.

Figure 2:
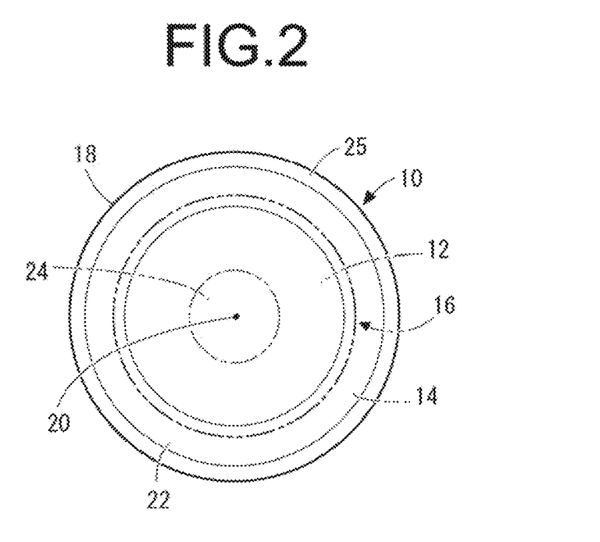
FIG. 2 is a front explanatory view for describing the state of wearing the colored contact lens shown in FIG. 1.

Then, as shown by the explanatory drawing of the wearing state in FIG. 2, with the colored contact lens 10 of this embodiment, the outer diameter dimension (DLA) is made to be able to cover the entire dark part of the eye 12 for the eye, and to cover a designated width up to the white part of the eye 14 part. Specifically, a boundary line (limbus) 16 of the dark part of the eye 12 and the white part of the eye 14 is positioned further to the inner circumference side than the edge part 18 which is the outer circumference edge of the colored contact lens 10. The dark part of the eye 12 is an area for which the color of the iris of the eye is visible from outside, but it is an area for which the iris can be seen through the transparent cornea, and because of that, the boundary line 16 can be understood as a boundary line of the cornea and the white colored :sclera positioned at its outer circumference side.

Furthermore, on the colored contact lens 10, a colored band 22 that expands in a ring shape is provided on the same center axis as a lens geometric center axis 20. This colored band 22 is formed such that the boundary line 16 of the eye on which it is worn extends in the circumference direction overlapping the colored band 22 across the entire circumference. Specifically, the colored band 22 is equipped with a radial direction width that broadens in the radial direction spanning both directions of the inner circumference side and the outer circumference side of the boundary line 16, and on the inner circumference side of the boundary line 16, the colored band 22 is overlapped on the dark part of the eye 12, and on the outer circumference side of the boundary line 16, the colored band 22 is overlapped on the white part of the eye 14. Preferably, the colored band 22 is set so that the radial direction width dimension of the area overlapping the white part of the eye 14 at the outside of the boundary line 16 is larger than the radial direction width dimension of the area overlapping the dark part of the eye 12 at the inside of the boundary line 16.

It is desirable that with this colored band 22, the inner diameter dimension be set to a degree that there is almost no overlapping on a pupil 24 under the many everyday life conditions of the wearer. By doing this, effects by the colored band 22 on vision are suppressed. From this perspective, the inner diameter dimension of the colored band 22 is preferably set to φ 8 mm or greater and more preferably φ9 mm or greater. For the inner circumference part of the colored band 22, considering the typical person's cornea size, so as to cover the dark part of the eye 12, the inner diameter dimension of the colored band 22 is preferably φ 12 mm or less, and more preferably φ 11 mm or less.

Meanwhile, so as to be able to cover the white part of the eye at a designated width, the outer diameter dimension of the colored band 22 is preferably φ 11 min or greater, and more preferably φ 12 mm or greater. At the outer circumference of the colored band 22, leaving a sufficient area of the white part of the eye when wearing is natural and is effective in bringing a cosmetic effect of showing the beauty of the white part of the eye, so the outer diameter dimension of the colored band 22 is preferably φ 14 nun or less, and more preferably φ 13 mm or less.

The colored band 22 can be provided up to the outermost circumference edge part 18 of the colored contact lens 10, but with this embodiment, the outer diameter dimension of the colored band 22 is smaller than the outer diameter dimension of the colored contact lens 10, and between the colored band 22 and the edge part 18, an outer circumference transparent area 25 is provided as a non-colored area in a ring shape that expands in the circumference direction at a radial direction designated width. Also, the colored contact lens 10, when used as a contact lens for vision correction, preferably has an optical part with vision correction optical characteristics at the center area which is apart from the colored band 22 to the inner circumference side, and has the colored band 22 provided at the peripheral part formed at the outer circumference side.

Then, to sufficiently exhibit the target cosmetic effect and the like, the colored band 22 with the inner diameter dimension and the outer diameter dimension set in this way preferably is formed with a width dimension of 0.75 to 3.0 nun in the radial direction, and more preferably a width dimension of 1.0 to 2.5 mm in the radial direction. The radial direction width dimension of the colored band 22 does not have to be fixed along the entire length of the circumference direction, and the inner circumference edge shape or the outer circumference edge shape can be a shape other than a circle, such as an oval or the like, but preferably, it is built using a ring shape having a fixed width dimension on the circumference.

Here, the colored band 22 does not have uniform density, but rather changes in the radial direction, and at least in the area overlapping the white part of the eye 14, a part is provided for which the density become smaller in the radial direction going from the inner circumference side to the outer circumference side. In particular with this embodiment, the colored band 22 changes density in the radial direction spanning the entirety of any of the parts overlapping the dark part of the eye 12 and the parts overlapping the white part of the eye 14.

Also, the forming method of this colored band 22 is not limited, and for example as noted in Japanese Unexamined Patent Publication No. JP-A-3-54519, can be coloring during casting of a contact lens forming monomer when forming the contact lens, hand drawing, or photographic printing, screen printing or the like, but considering matters such as the attachment surface being a spherical surface, mass production capability, coloring precision, color reproducibility and the like, pad printing or inkjet printing are preferable.

With pad printing, after filling a coloring agent in a dot pattern formed with an etching process on a metal plate, for example, it is possible to form the colored band 22 by moving the dot pattern coloring agent using a silicon pad, and to transfer this dot pattern coloring agent to the contact lens.

More preferably, inkjet printing is used. With inkjet printing, as is well known, with a piezo element or the like as an actuator, the coloring agent is sprayed from a large number of tiny nozzles, and is attached directly on the contact lens which is the surface to be colored. With this kind of inkjet printing, pressure by a pad or the like on the contact lens is not necessary, and this is especially preferable because it is possible to form tiny clots with high precision, and because it is easy to express various colors on the entirety by adjusting the number of the plurality of colors of dots or their ratio to each other.

Furthermore, the coloring mode of this colored band 22 is not limited, and it is possible to have a flat application mode for which a translucent coloring agent is painted across the entire surface, but it is preferable to do coloring in dot form using a translucent or non-translucent coloring agent because it is possible to do density adjustment easily and with good precision. In particular with the clot form coloring, after forming of the contact lens, this can be performed by attaching a coloring agent containing dye or pigment in dot form on one or both of the front surface or back surface thereof. As described previously, the color of the coloring agent and thus the colored dots used are not limited, but in particular with the present invention, as an adjustment measure for the hue or the like, as described above, it is possible to adjust the size or concentration (gaps) of colored clots 26, or with a plurality of mutually different colors of colored dots 26 provided, to adjust the ratio of the colors. As an attachment method for the colored dots 26, the inkjet printing described above is preferable.

Alternatively, it is also possible to use an item for which colored dots 26 are formed on the interlayer of the contact lens front surface and back surface for the present invention. As the method for forming colored dots 26 on this interlayer, an example is a method of providing colored dots 26 on a half layer of the front surface or back surface side, and adhering the remaining half layer. By working in this way, it is possible to Obtain a colored contact lens with a laminated structure for which transparent layers are respectively provided on both the flout and back sides of the colored layer. As described previorsly, the colored layer, in addition to being formed as a printing layer, can also be formed as a colored resin layer using a colored forming monomer in which a coloring material is dissolved as noted in the above-mentioned Japanese Unexamined Patent Publication No. JP-A-3-54519. Also, though it depends on the colored layer forming method, the translucency and the like, when using a laminated structure consisting of at least one layer each of the colored layer and the transparent layer, it is preferable that the layer thickness of each transparent layer be 5 μm to 300 μm, and that the layer thickness of each colored layer be 0.2 μm to 100 μm. In particular as the colored layer, when using a printed layer made using pad printing, inkjet printing or the like, it is preferable to set the layer thickness of the printed layer to be smaller than the transparent layer.

Also, with the colored band 22 formed by attaching and fixing colored dots 26 to the lens using inkjet printing, by making the density or gradation of each colored dot 26 itself different, it is also possible to change the density from the inner circumference side toward the outer circumference side. Meanwhile, with the colored contact lens 10 of this embodiment shown in FIG. 1, using colored dots 26 for which the density and gradation of each colored dot itself is the same, the density is changed by making the size of the colored dots 26 different according to the radial direction position of the colored contact lens 10.

In specific terms, circular colored dots 26 are used and each colored dot 26 itself has the same color and density Also, as shown in FIG. 1, a plurality (4 in the item in the drawing) of circular array lines extending concentrically at the colored contact lens 10 are provided virtually, and a large number of colored dots 26 are provided allowed on each of these circular array lines. With this embodiment, the circular array lines are provided at equal intervals in the radial direction, and on all the circular array lines, a plurality of colored dots 26 are provided at equal intervals. Also, with this embodiment even between different circular array lines, the interval of the colored dots 26 is the same. However, in the drawing, to make it easier to get an image of the array of colored dots 26, the interval and size of the colored dots 26 is not represented accurately in terms of the interrelation of the circular array lines.

Specifically, with this embodiment, all the colored dots 26 provided on the same circular array line are the same size, and colored dots 26 provided on different circular array lines are made to have mutually different sizes between them. Then, as it goes from the circular array line positioned at the inner circumference side to the circular array line positioned at the outer circumference side, the size (outer diameter dimension) of the colored dots 26 provided on that circular array line becomes gradually smaller.

As shown in FIG. 1, the size of the colored dots 26 for each circular array line is determined corresponding to changes in the preset color density on the radial direction line of the colored band 22. In specific terms, with this embodiment, a density design line 28 is set to become smaller in a primary straight line from the inner circumference side toward the outer circumference side spanning the entire radial direction of the colored band 22. Then, for each circular array line, the density to be set is found from that radial direction position using the density design line 28. This density can be recognized as the surface area ratio occupied by the colored dots 26 per unit surface area, so with this embodiment for which the colored dots 26 are provided at equal intervals on all the circular array lines, the color density in the graph noted in FIG. 1 can be the surface area of one colored dot 26. In this way, from the density design line 28, it is possible to find the size of the colored dots 26 provided on each circular array line.

Then, by making the size of the colored dots 26 different according to the radial direction position on the colored contact lens 10 in this way, even if the number of colored dots 26 per unit surface area as the concentration of the colored dots 26 is not made different, in the radial direction of the colored band 22, the density change is realized for the entire colored band 22 (even if the density of each colored dot 26 itself is not different). To say this another way, if we focus on the density on each circular array line, compared to the density on the inner circumference side circular array line, as it goes onto the outer circumference side circular array line, the density gradually becomes lower. This density change is realized using halftones rather than the gradations of the colored dots 26 themselves.

However, though it is acceptable for the colored dots 26 to be an achromatic color, it is preferable to include items that are a chromatic color, and doing that makes it possible to obtain an even more beneficial cosmetic effect. In the case of a chromatic color, it is possible to use a single color, and also possible to express various colors based on a mixed color method by providing colored dots 26 having mutually different hues with a suitable relative ratio of size and density.

Also, as the coloring agent used for the colored dots 26, it is possible to use as appropriate various types of coloring agent known from the past without distinguishing pigments and dyes or distinguishing colors. Specifically, it is possible to use a coloring agent obtained by mixing one or a plurality of types of suitable pigments or dyes selected considering the target color with a corresponding solvent, and in that coloring agent, it is possible to blend as appropriate a hardening agent or additives corresponding to the material of the contact lens to be colored or to the used fixing process or the like.

Here, the color used for the coloring agent and thus the colored dots 26 are not limited, as described above, but in particular with the present invention, it is preferable to include at least one of blue or green as a hue. The hue can be found with the Munsell color system, fix example. In specific terms, with the Munsell hue circle, when we assume a total of 10 lunes with a total of 5 provided between each of 5 fundamental colors (R. YR, Y GY, G, BG, B, PB, P, RP), among those, colors containing G or B (GY, G, BG, B PB) are preferably used with the present invention. Similarly with a color system that is broken into more detail, colors containing blue (B) or green (C) are preferably used with the present invention.

By using the blue or green color system with the colored band 22 in this way, as the impression when another person sees the eye of the person wearing that colored contact lens 10, the whiteness of the white part of the eye is emphasized, and it is possible to more effectively give a young, fresh, pure and friendly image. This reflects a difference point in terms of the external appearance of a child's eye and an adult's eye in that there is an area with a special blueness in the eye of a child at the boundary area of the dark part of the eye and the white part of the eye. The inventors of this invention focused attention on this special external appearance of a child's eye, and as a result of earnest study, found that it is possible to express a similar area with the blueness in the eye of a child for the boundary area of the dark part of the eye 12 and the white part of the eye 14 using the colored contact lens 10 of the present invention, and by giving a gradually thinning density distribution to that area from the dark part of the eye 12 toward the white part of the eye 14, it is possible to convey to another person a pure image like that of the eye of a child while ensuring a very natural external appearance, which is as novel cosmetic effect that was not available with the prior art.

Therefore, with the colored contact lens 10 of this embodiment with this kind of structure, by wearing it, it is possible to avoid generating a clear line at the part of the white part of the eye 14 positioned at the outer circumference side of the dark part of the eye 12, and to give the eye of the wearer a special cosmetic effect while maintaining a natural external appearance with a sense of warmth. Also, as a coloring effect of this transitional area, by setting the density of the inner circumference part of the colored band 22 to be high, it is also possible to make the dark part of the eye appear bigger to the outer circumference side, and as the impression of the wearer's eye seen by another person, we can expect the effect of bringing a more friendly feeling.

Regarding the specific coloring mode or density distribution mode and the like for the colored band 22, the fact that it is possible to change to many modes without being limited to the first embodiment is as described previously, and hereafter, we will show examples of the second through eight embodiments as the other specific modes for these. Among these second through eighth embodiments, for the members and parts with the same structure as the first embodiment, these are noted in each drawing with the same code number as that of the first embodiment, and a detailed description of these will be omitted, With a colored contact lens 30 shown in FIG. 3 as the second embodiment of the present invention, the radial direction density distribution of the colored band 22 is different from the first embodiment. In specific terms, a fixed density area 31 is formed for which the density is fixed at an area of as designated width in the radial direction of the inner circumference part of the colored band 22.

Figure 3:
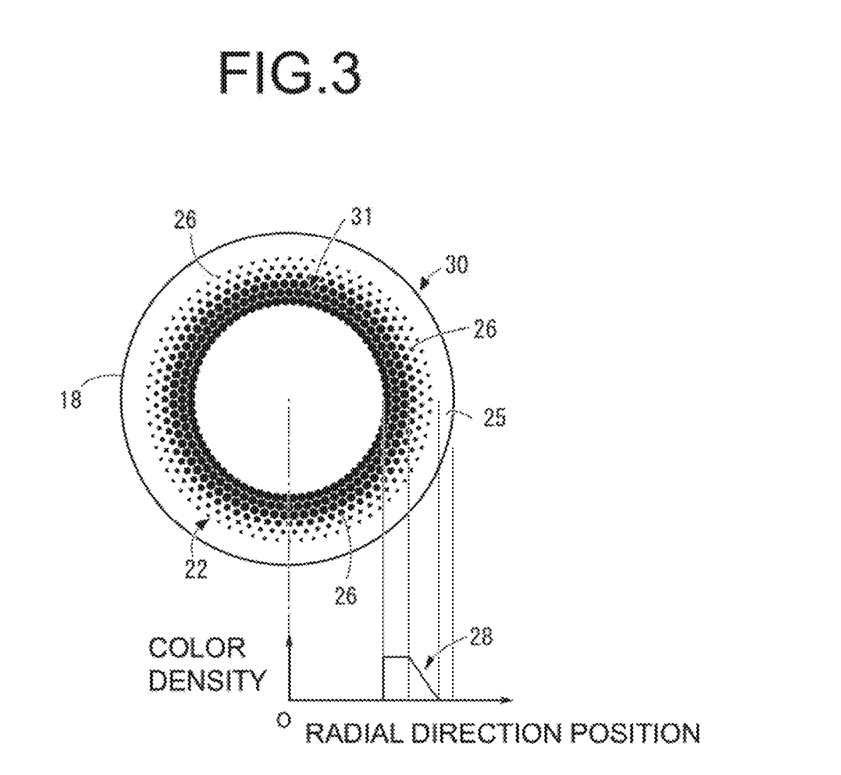
FIG. 3 is a front explanatory view showing a colored contact lens which is a second embodiment of the present invention.

Specifically, three circular array lines are set at this fixed density area 31, and on each circular array line, colored dots 26 all having the same size, color, and density are formed. These colored dots 26 are set to be the same as each other in terms of the interval (concentration) on each circular array line. By doing that, at the ring shaped band area for which these three circular array lines are set, the density of coloring by the colored dots 26 is roughly fixed.

With this kind of colored contact lens 30 as the second embodiment, for example by having the part that overlaps the dark part of the eye 12 as the fixed density area 31, it is possible to avoid changing in the radial direction up to the color of the dark part of the eye 12 of the wearer, and it is possible to show the color of the dark part of the eye 12 on the wearer evenly across the entirety.

Also, by setting the outer diameter dimension of the fixed density area 31 to be larger than the outer diameter dimension of the dark part of the eye 12 for the wearer so as to pull the fixed density area 31 from the dark part of the eye 12 to the outer circumference side, it is possible to make the outer diameter dimension of the dark part of the eye 12 of the wearer look bigger. In that case, it is preferable to form the colored dots 26 provided on the fixed density area 31 overlapping at least the dark part of the eye 12 in a hue that looks black or brown, or with a high density.

Figure 4:
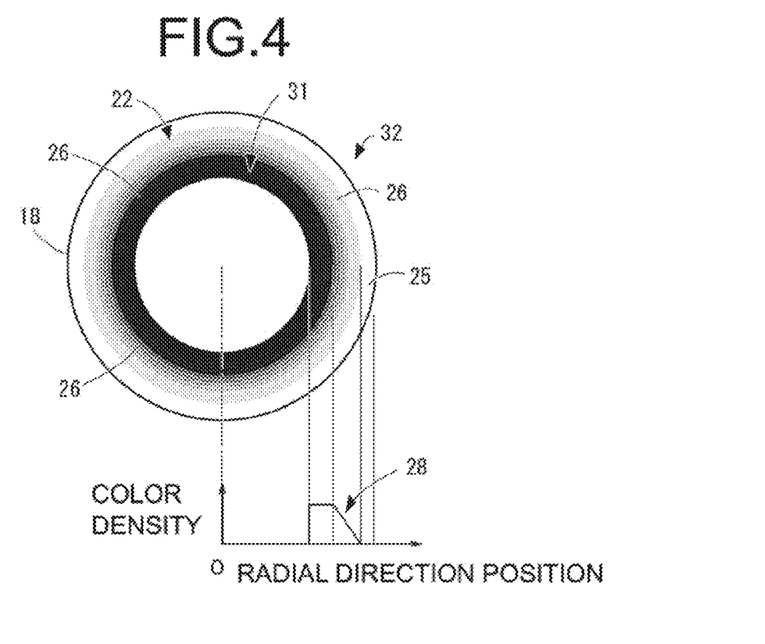
FIG. 4 is a front explanatory view showing a colored contact lens which is a third embodiment of the present invention.

Also, with a colored contact lens 32 shown in FIG. 4 as the third embodiment of the present invention, the mode of realizing the density distribution in the radial direction with the colored band 22 differs from the first embodiment. In specific terms, by making the depth (density or transparency level) of the colored dots 26 constituting the colored band 22 different in the radial direction of the colored band 22, the density of the colored band 22 is set to be smaller in the radial direction toward the outer circumference side. With this embodiment as well, the same as with the second embodiment, the fixed density area 31 is formed at the inner circumference part of the colored band 22, and at that fixed density area 31, the depth of all the colored dots 26 is the same.

In this way, the depth of the colored dots 26 themselves are made to differ according to the radial direction position of the circular array line, and it is possible to realize radial direction density changes with the colored band 22 even while setting the size and concentration of the colored dots 26 provided on each circular army line to be the same.

Figure 5:
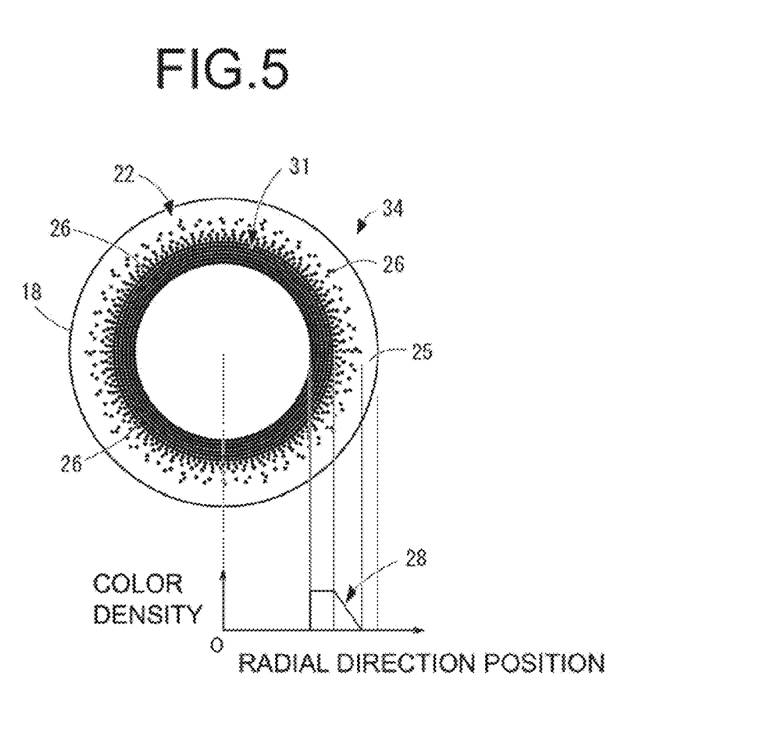
FIG. 5 is a front explanatory view showing a colored contact lens which is a fourth embodiment of the present invention.

Furthermore, with a colored contact lens 34 shown in FIG. 5 as the low embodiment of the present invention, the mode of realizing the density distribution in the radial direction of the colored band 22 differs from all of the first to third embodiments. In specific terms, by linking the number of colored dots 26 per unit surface area as the concentration of the colored dots 26 constituting the colored band 22 be different in the radial direction of the colored band 22, the density of the colored band 22 is set to be smaller toward the outer circumference side in the radial direction. With this embodiment as well, the same as with the second embodiment, the fixed density area 31 is formed in the inner circumference part of the colored band 22, and at this fixed density area 31, the concentration of the colored dots 26 is the same.

In this way, by making the concentration of the colored dots 26 differ in the radial direction position, more specifically, by setting the circumference direction separation distance of the colored dots 26 provided on the line to be larger as it goes to the outer circumference side circular array line according to the radial direction position of the circular array line, for example, it is possible to realize radial direction density change for the colored band 22 while setting the size and depth of the colored dots 26 provided on each circular array line to be the same.

Figure 6:
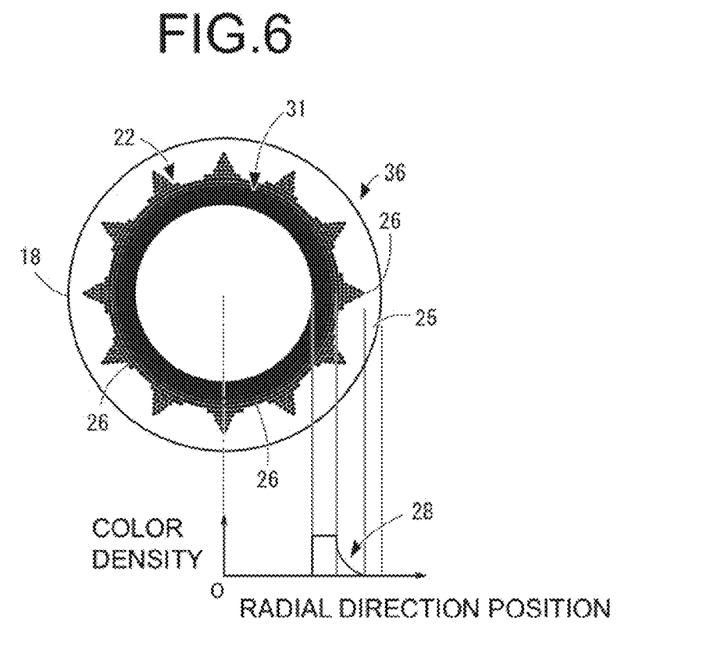
FIG. 6 is a front explanatory view showing a colored contact lens which is a fifth embodiment of the present invention.
Figure 7:
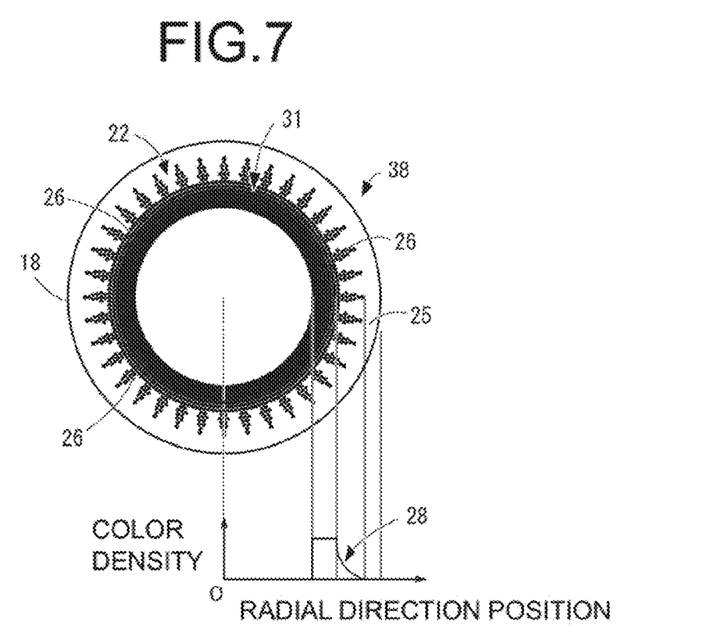
FIG. 7 is a front explanatory view showing a colored contact lens which is a sixth embodiment of the present invention.

With a mode that makes the concentration of the colored dots 26 different according to the radial direction position on the lens in this way, in addition to providing the colored dots 26 either randomly or dispersed in a uniform state on the entirety as with the fourth embodiment, it is also possible to for example provide colored dots 26 collected at a plurality of suitable areas as with a colored contact lens 36 as a fifth embodiment of the present invention shown in FIG. 6, or as shown with a colored contact lens 38 as a sixth embodiment of the present invention shown in FIG 7.

In particular with the colored contact lens 36 shown in FIG. 6, a plurality of colored dots 26 are formed in a triangular shaped collective mode projecting toward the outer circumference side at a plurality of locations set to be roughly equal on the circumference, and a density distribution is realized that becomes smaller in a logarithmic graph form facing the radial direction outward. Also, with the colored contact lens 38 shown in FIG. 7, a plurality of colored dots 26 are formed using an arrowhead shaped collective mode instead of the triangular shaped collective mode used with the colored contact lens 36 in FIG. 6.

Figure 8:
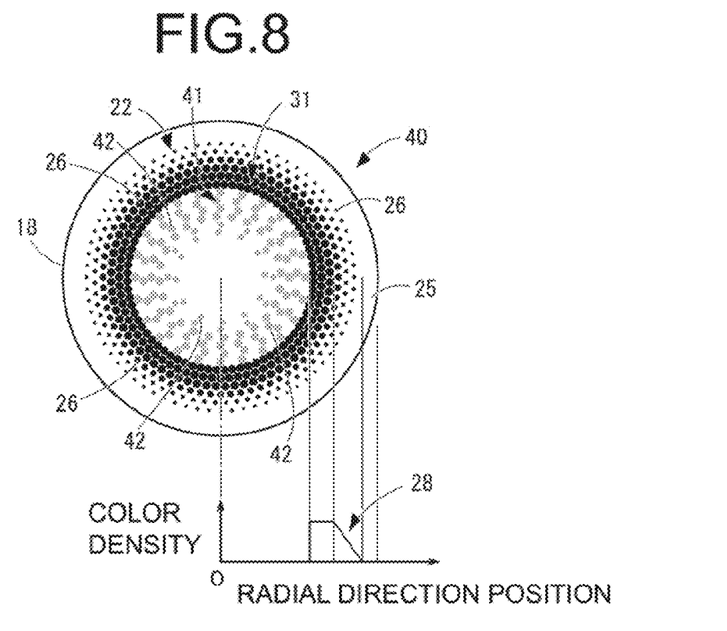
FIG. 8 is a front explanatory view showing a colored contact lens which is a seventh embodiment of the present invention.

Furthermore, with a colored contact lens 40 shown in FIG. 8 as the seventh embodiment of the present invention, the same constitution as that of the second embodiment is used as the colored band 22, but furthermore, in addition to the colored band 22, this has coloring formation of an iris pattern 41.

This iris pattern 41 is foamed in an area overlapping the dark part of the eye of the wearer, and by providing this iris pattern 41, it is possible to show the hue and density of the dark part of the eve of the wearer differently This iris pattern 41 can also be formed using a suitable shape and mode with a suitable known printing method in the same way as the colored band 22 but in particular with this embodiment, the same as with the colored dots 26 of the colored band 22, this can be formed by providing a large number of tinted dots 42 using inkjet printing. The tinted dots 42 can be set freely in terms of color, density, shape, pattern, and dot concentration and the like, without regard to the colored dots 26.

Figure 9:
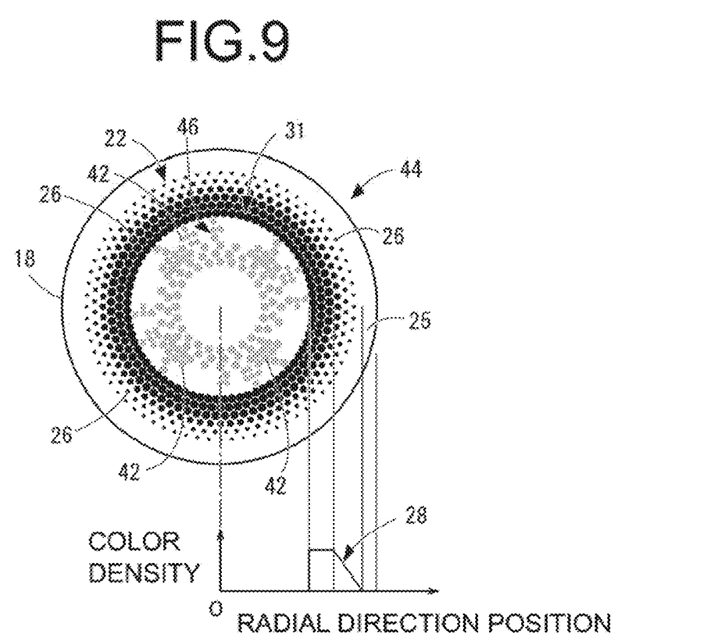
FIG. 9 is a front explanatory view showing a colored contact lens which is a eighth embodiment of the present invention.

For example, with the colored contact lens 40 of FIG. 8, the iris pattern 41 is formed in a plurality of linear shapes for which the density becomes gradually smaller toward the inner circumference side, but as with a colored contact lens 44 shown as the eighth embodiment in FIG. 9, it is also possible to use an iris pattern 46 constituted with a large number of dispersed form tinted dots 42 for which the density becomes greater toward the inner circumference side.

These iris patterns 41 and 46 are positioned further to the inner circumference side than the boundary line (limbus) 16 so as to cover the dark part of the eye 12, and for example are formed extending facing from the inner circumference edge part of the colored band 22 toward the radial direction inward, but so as not to cover the pupil when at all possible, it is preferable that they not be formed at the center part of the colored contact lenses 40 and 11. Also, considering cases when the iris patterns 41 and 46 cover up to the pupil, preferably, the density of the iris patterns 41 and 46 is made smaller than the density of the colored band 22, and an item with high translucency is used as the coloring agent of the tinted dots 42 that form the iris patterns 41 and 46.

Following, as examples of the present invention, three types of items manufactured according to the colored contact lens 34 of the fourth embodiment shown in FIG. 5 were actually produced (example 1, example 2, and example 3). Then, those three types of colored contact lenses were worn, and the results of the respective evaluations of the impression of the wearer himself and the impression of the worn state seen by another person are shown below as example experiment data. When doing those experiments, to make the features of the present invention objectively clearer, the 1-Day Actuate Define Accent Style (registered trademark), which is a contact lens on the market made by Johnson & Johnson K.K., were worn and evaluated in the same Malffier, and the results of a comparison evaluation with the example products of the present invention were used as experiment data.

EXAMPLE 1

As the pigment composition, 1.0 parts by mass of polymerizable pigment 1,4-bis:((ethyl phenyl)amino)-anthraquinane which exhibits a green color, 2,0 parts by mass of 2-hydroxy2-methyl-1-phenylpropane-1-one as the radical polymerization initiator, as well as 100 parts: by mass of 1-methyl-2-pyrrolidillone as a solvent were mixed to prepare:a: pigment composition.

Next, using a piezo type inkjet device, on the front surface side of the 2 Week Premio (registered trademark) available on the market and made by Menicon Co., Ltd. which is a soft contact lens consisting of a silicone hydrogel, by respectively printing a large number colored dots 26 independently for which the diameter is in a range from φ 10 min to φ 13.0 mm around the lens geometric center axis, a ring shaped colored band 22 was provided. The same as with the fourth embodiment shown in FIG. 5, of the colored band 22, a fixed density area 31 was formed in the inner circumference area of φ 10 mm to φ 11.5 mm, and also, in the radial direction dimension area of φ 11.5 mm to φ 13.0 mm, the concentration of the colored clots 26 was made to be different in the radial direction so as to farm a pattern having an area for which the color density gradually decreases from the inner circumference side to the outer circumference side.

After confirming that all of the dye composition penetrated the lens base (the aforementioned 2 Week Premio (registered trademark)), using the ultraviolet ray irradiation device "UV Spot Cure SP-3" (registered trademark) made by Ushio Inc., ultraviolet rays of dominant wavelength 365 mm and radiation intensity 500 mW/cm$^2$ were irradiated for 20 seconds. After that, by doing hydration swelling of the lens, the target colored contact lens was obtained.

EXAMPLE 2

The colored band 22 is formed with a diameter in the range of a φ 10.5 mm to φ 12.0 min around the lens geometric center axis 20, and the inner circumference area of φ 10.5 mm to φ 11.0 mm was made to be a fixed density area, and also in the radial direction dimension area of φ 11.0 mm to φ 12.0 mm, the concentration of the colored dots 26 was made to be different in the radial direction so as to form a pattern having an area for which the color density gradually decreases from the inner circumference side toward the outer circumference side. The remainder was done the same way as with example 1 to obtain the colored contact lens.

EXAMPLE 3

As the pigment composition, instead of the 1.0 parts by mass of polymerizable pigment 1,4-bis((ethenyl phenyl) amino)-anthraquinone of example 1, used was 1.0 parts by mass of a known polymerizable azo type dye noted in paragraph [0041] of International Patent Publication No. WO 2009/044853 that exhibits a dark blue color. The remainder was done the same way as with example 1 to obtain the colored contact lens.

TABLE 1

1) Evaluation of Impression by the Wearer Him/Herself

| Question Content | Lens | n | a) I agree | b) I don't agree | c) Not sure |
|---|---|---|---|---|---|
| A) The impression changed compared to when not wearing. | Example 1 | 5 | 4 | 0 | 1 |
| | Example 2 | 5 | 4 | 0 | 1 |
| | Example 3 | 3 | 3 | 0 | 0 |
| | Comparison Example | 5 | 4 | 0 | 1 |

| Question Content | Lens | n | d) The example gives a more natural impression | e) The comparison example gives a more natural impression | f) Not sure |
|---|---|---|---|---|---|
| B) Regarding the impression when wearing | Example 1 | 5 | 4 | 1 | 0 |
| | Example 2 | 5 | 4 | 1 | 0 |
| | Example 3 | 3 | 1 | 1 | 1 |

| Question Content | Lens | n | g) The example gives the white part of the eye a whiter impression | h) The comparison example gives the white part of the eye a whiter impression | f) Not sure |
|---|---|---|---|---|---|
| C) Regarding the impression of the white part of the eye when wearing | Example 1 | 5 | 4 | 0 | 1 |
| | Example 2 | 5 | 4 | 0 | 1 |
| | Example 3 | 3 | 1 | 1 | 1 |

TABLE 2

2) Evaluation of Impression by Others

| Question Content | Lens | n | a) I agree | b) I don't agree | c) Not sure |
|---|---|---|---|---|---|
| A) The impression changed compared to when not wearing. | Example 1 | 35 | 31 | 1 | 3 |
| | Example 2 | 35 | 28 | 3 | 4 |
| | Example 3 | 6 | 5 | 0 | 1 |
| | Comparison Example | 35 | 30 | 1 | 4 |

| Question Content | Lens | n | d) The example gives a more natural impression | e) The comparison example gives a more natural impression | f) Not sure |
|---|---|---|---|---|---|
| B) Regarding the impression when wearing | Example 1 | 35 | 22 | 6 | 7 |
| | Example 2 | 35 | 21 | 8 | 6 |
| | Example 3 | 6 | 3 | 1 | 2 |

| Question Content | Lens | n | g) The example gives the white part of the eye a whiter impression | h) The comparison example gives the white part of the eye a whiter impression | f) Not sure |
|---|---|---|---|---|---|
| C) Regarding the impression of the white part of the eye when wearing | Example 1 | 35 | 25 | 1 | 9 |
| | Example 2 | 35 | 27 | 0 | 8 |
| | Example 3 | 6 | 3 | 1 | 2 |

From the experiment results shown in Table 1 and Table 2 noted above, by using the colored contact lens constituted according to the present invention, it was acknowledged that a change in the impression of the eye with wearing is effectively realized while maintaining a natural impression both subjectively and objectively. In the tables, n is the number of evaluations (number of people).

Figure 10:
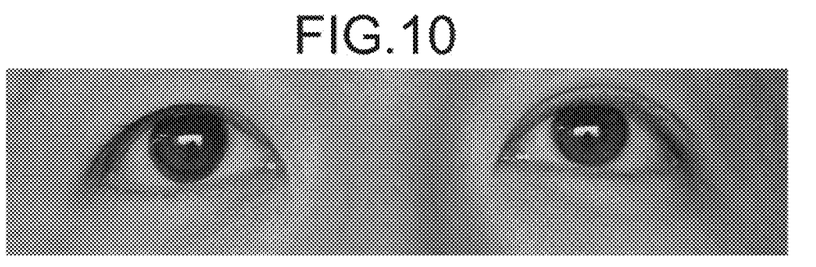
FIG. 10 is an explanatory drawing of a colored contact lens of the present invention worn on the left eye, and a comparison example contact lens available on the market worn on the right eye, with this state photographed from the front.
Figure 11:
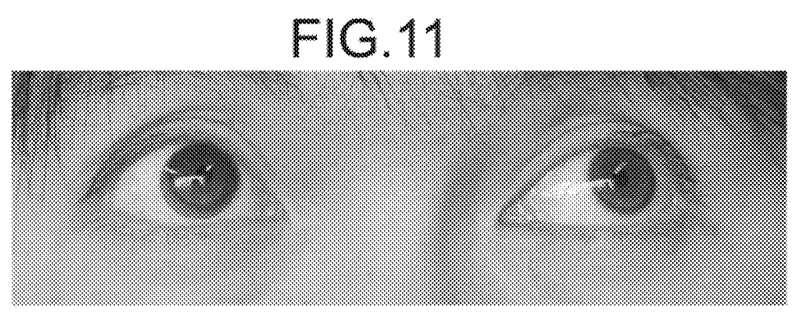
FIG. 11 is an explanatory drawing of a colored contact lens of the present invention worn on the left eye, and a comparison example contact lens available on the market worn on the right eye, with this state photographed from the front.
Figure 12:
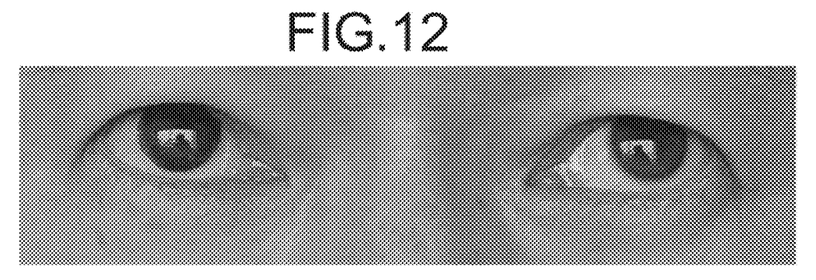
FIG. 12 is an explanatory drawing of a colored contact lens of the present invention worn on the left eye, and a comparison example contact lens available on the market worn on the right eye, with this state photographed from the front.

Also, the fact that this change in the impression of the eyes also brings a cosmetic effect that gives a sense of freshness and sense of cleanliness is difficult to perform an objective evaluation for with words, so though it is not reflected in the experiment results noted above, this matter is also acknowledged objectively from the photographs during wearing shown by example in FIG. 10 to FIG. 12. In these FIG. 10 to FIG. 12, the colored contact lens of the aforementioned example 1 is worn in the left eye of the wearer (right side facing the drawing), and also, the aforementioned comparison example contact lens available on the market is worn on the right eye (left side facing the drawing), and in this state, a photo was taken from the front. With the right eye which is the comparison example, the sharp boundary line of the colored part of the contact lens protruding to the outer circumference side from the outer edge of the dark part of the eye looks like a boundary line between the dark part of the eye and the white part of the eye, but since it is so sharp, it looks artificial, while in contrast, with the left eye which is the example, a natural transitional area is formed, and combined with that being blue or green, we can see that this feels natural and brings a sense of freshness.

Figure 13:
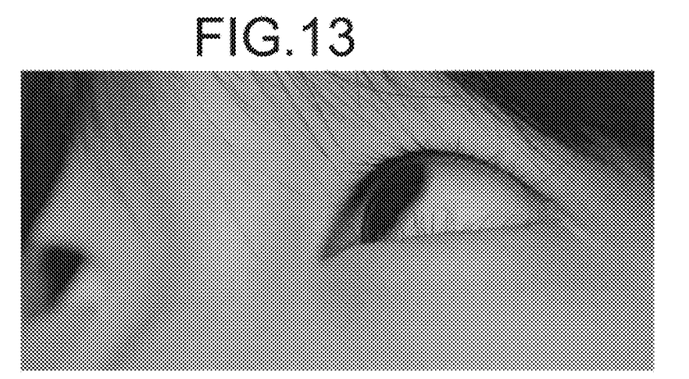
FIG. 13 is a reference drawing with the eye of a child photographed.

Incidentally, with the boundary part of the dark part of the eye and the white part of the eye in a state with the example worn in the left eye shown in these FIG. 10 to FIG. 12, in the photograph of a child's eye shown for reference in FIG. 13, compared to the dark part of the eye and white part of the eye boundary part, we can see that the example gives an external appearance similar to that.

In addition, with the comparison example of the prior art constitution with the sharp outer edge (boundary line) of the colored part, when the cornea is positioned at the corner between the top and bottom eyelids by looking in a diagonal direction as shown in FIG. 10 to FIG. 12, as the geometric center of the contact lens is displaced from the cornea center, there is a skew between the direction that the wearer is looking (actual cornea center) and the direction the wearer is thought to be looking when another person looks at the external appearance (center of the colored part of the contact lens), and there is the risk that this will give another person a strange sense when they see it. In FIG. 10 to FIG. 12, this can be perceived by the fact that though we can see that the wearer's left eye is looking diagonally, it looks like the wearer's right eye is looking generally toward the front. With the example product of the present invention, by having the outer edge of the colored band not be sharp, the skew in the sight line direction seen from the other person when the geometric center of the colored contact lens is displaced from the cornea center is suppressed.

To more effectively suppress, the skew in the sight line direction seen from the other person when the geometric center of the colored contact lens is displaced from the cornea center, it is preferable to have the colored band be a transparent color so that the boundary line (limbus) of the dark part of the eye which is the cornea outer circumference edge for the wearer can be seen by other people. Specifically, the transmissivity: Tt (Tt=T2 (total volume of transmitted light)/T1 (incident light volume)) of the visible light rays (light rays of wavelength 380 to 780 nm) at the colored band is preferably 30 to 99% on the overall average, and more preferably 50 to 90%.

EXAMPLE 4

With this example, using the method below, a colored contact lens with a laminated structure for which transparent layers are respectively formed on both the front and back sides of the colored layer is obtained.

First, the coloring agent was prepared. Specifically, 100 parts by weight of chrome (HI) oxide which is a pigment exhibiting a green color, 10 parts by weight of silica as a dispersion agent, 100 parts by weight of 2-hydroxy ethyl methacrylate as a binder agent, and 1 part by weight of benzoin methyl ether as a polymerization initiator were vigorously mixed and dispersed to become approximately evenly dispersed, and a paste form coloring agent was obtained.

Next, using a steel plate on which the pattern of FIG. 5 is etched, a printing pad of the concerned pattern of dots was prepared. Specifically, after filling the coloring agent in the dot pattern formed by etching on the surface of the steel plate, the printing pad made of silicon was overlapped on the surface of the steel plate, and the coloring agent of the dot pattern was transferred to the printing pad.

Meanwhile, as the lens forming material, using a lens monomer consisting of 100 parts by weight of 2-hydroxy ethyl methacrylate and 1 part by weight of benzoin methyl ether, a lens semi-formed article A having a spherical crown shape of center thickness approximately 50 μm was obtained by mold forming. Then, using a pad print device "SPACE PAD" made by Mishima Co., Ltd. on the concave surface side of that lens semi-formed article A, the aforementioned printing pad was overlapped, and pad printing was performed by transferring the coloring agent of the dot pattern. Furthermore, using the ultraviolet ray radiation device "UV Spot Cure SP-3" (registered trademark) made by Ushio Inc., the coloring agent printed on the concave surface of the aforementioned semi-formed article A was cured and the printing process was completed.

After that, a lens monomer consisting of 100 parts by weight of 2-hydroxy ethyl methacrylate and 1 part by weight of benzoin methyl ether is flowed into the concave surface of the lens semi-formed article A on which the dot pattern is printed, and by mold forming, a spherical crown shaped lens semi-formed part B that expands along the concave surface of the lens semi-formed article A was formed.

With the colored contact lens of this example formed in this way, at both the front and back surfaces sandwiching in the lens thickness direction the colored layer formed by pad printing, transparent layers are respectively formed by the lens semi-formed article A and the lens semi-formed article B, so the colored layer has an embedded constitution, and as shown in FIG. 5, with the front view, it was possible to confirm formation of the target colored band 22.

KEYS TO SYMBOLS

10, 30, 32, 34, 36. 38, 40, 44: Colored contact lens
12: Dark part of the eye
14: White part of the eye
16: Boundary line
22: Colored band
25: Outer circumference transparent area (non-colored area)
26: Colored dot
31: Fixed density area
41, 46: Iris pattern

The invention claimed is:

1. A colored contact lens adapted to be worn on an eye, comprising:
    a ring shaped colored band arranged for covering a boundary line of a dark part and a white part of the eye, while broadening on an inner circumference side and an outer circumference side of the boundary line, the colored band being formed by adhesion of colored dots to the lens, wherein
        a density of the colored band decreases from the inner circumference side toward the outer circumference side,
    an inner diameter dimension of the colored band is 8 mm or greater, and an outer diameter dimension of the colored band is 14 mm or less,
    an entire area of the colored band is constituted with an arrangement pattern of the colored dots, each of the colored dots being at least partially separated from adjacent colored dots, and
    the density of the colored band changes in a radial direction such that the density of the colored band decreases toward the outer circumference side in the radial direction by decreasing a density of a coloring agent of the colored dots themselves, although a number of the colored dots per unit surface area remains unchanged.

2. The colored contact lens according to claim 1, wherein the colored band is formed including at least one of blue and green as a hue.

3. The colored contact lens according to claim 1, wherein the colored dots are formed by using inkjet printing.

4. The colored contact lens according to claim 1, wherein the colored band is formed by adhering light permeable dye ink to the lens.

5. The colored contact lens according to claim 1, wherein an inner circumference part of the colored band includes a fixed density area for which the density is fixed for a designated width in a radial direction.

6. The colored contact lens according to claim 1, wherein a non-colored area is provided to the outer circumference side of the colored band.

7. The colored contact lens according to claim 1, wherein an iris pattern is depicted on an area positioned on the inner circumference side of the boundary line.

8. The colored contact lens according to claim 1, wherein the arrangement pattern of the colored dots is arranged radially from a lens geometric center axis in a circular shape using a polar coordinates system so that density changes from the lens geometric center axis are the same in a circumferential direction of the lens.

9. The colored contact lens according to claim 8, wherein the density of the colored band decreases toward the outer circumference side along a radial line.

* * * * *